US012188443B2

(12) United States Patent
Dragic

(10) Patent No.: US 12,188,443 B2
(45) Date of Patent: Jan. 7, 2025

(54) DEVICE FOR CONVERSION OF WAVE ENERGY INTO ELECTRICAL ENERGY

(71) Applicant: Mile Dragic, Zrenjanin (RS)

(72) Inventor: Mile Dragic, Zrenjanin (RS)

(*) Notice: Subject to any disclaimer, the term of this patent is extended or adjusted under 35 U.S.C. 154(b) by 0 days.

(21) Appl. No.: 17/945,303

(22) Filed: Sep. 15, 2022

(65) Prior Publication Data
US 2023/0089008 A1    Mar. 23, 2023

(30) Foreign Application Priority Data
Sep. 17, 2021   (RS) .................................. 2021/1153

(51) Int. Cl.
F03B 13/18    (2006.01)

(52) U.S. Cl.
CPC .... *F03B 13/1845* (2013.01); *F05B 2220/705* (2020.08); *F05B 2240/93* (2013.01); *F05B 2250/132* (2013.01); *F05B 2260/503* (2013.01); *F05B 2260/505* (2013.01); *F05B 2260/64* (2013.01)

(58) Field of Classification Search
CPC ................ F03B 13/1845; F03B 13/186; F05B 2220/705; F05B 2230/50; F05B 2240/93; F05B 2250/132; F05B 2260/04; F05B 2260/503; F05B 2260/505; F05B 2260/64; Y02E 10/30
See application file for complete search history.

(56) References Cited

U.S. PATENT DOCUMENTS

| 4,469,955 A | * | 9/1984 | Trepl, II | F03B 13/1815 60/498 |
| 9,115,686 B2 | * | 8/2015 | Stewart | F03B 11/00 |

(Continued)

FOREIGN PATENT DOCUMENTS

| EP | 2183478 | 5/2010 |
| EP | 2596235 | 5/2013 |

(Continued)

OTHER PUBLICATIONS

Search Report & Written Opinion issued in PCT/EP2022/075846 (Jan. 9, 2023).

*Primary Examiner* — Jesse S Bogue
(74) *Attorney, Agent, or Firm* — Barnes & Thornburg LLP; Mark J. Nahnsen

(57) ABSTRACT

The device for conversion of wave energy into electrical energy consists of a supporting structure, the first working body, an anchor and anchor cables. The supporting structure is connected to the anchors by anchor cables, while the first working body is slidably connected to the supporting structure. The motion transformation system is firmly connected to the supporting structure and comprises rigid gears toothed with gears with rolls on one side while on the other side they are hinged to the first working body, on the other side of the gears with the rolls, rigid gears are connected at one end, while their other end is hinged to other working body. The gears with rolls are connected by shafts with a multiplier that drives the generator that further produces electricity. The device constructed in this way has the possibility of transport to the place of exploitation, because it floats stably on its own. The anchor system is transported to the place of exploitation using a transport body that also has the ability to float on its own and to submerge.

16 Claims, 23 Drawing Sheets

(56) References Cited

U.S. PATENT DOCUMENTS

| | | | |
|---|---|---|---|
| 10,094,356 B2* | 10/2018 | Rohrer | H02K 7/18 |
| 2011/0084488 A1* | 4/2011 | Eder | F03B 13/186 |
| | | | 290/53 |
| 2013/0127168 A1 | 5/2013 | Dragic | |
| 2015/0204304 A1* | 7/2015 | Sidenmark | F03B 13/182 |
| | | | 60/497 |
| 2015/0266549 A1* | 9/2015 | Qu | F03B 13/189 |
| | | | 248/550 |
| 2016/0032887 A1* | 2/2016 | Patton | F03B 13/1865 |
| | | | 60/504 |
| 2019/0120201 A1* | 4/2019 | Dragic | H02K 7/1869 |
| 2020/0386201 A1 | 12/2020 | Lander | |
| 2023/0250792 A1* | 8/2023 | Martinez Revaliente | |
| | | | F03B 13/18 |
| | | | 60/505 |

FOREIGN PATENT DOCUMENTS

| | | |
|---|---|---|
| GB | 2555854 | 5/2018 |
| WO | WO 2017/176142 | 10/2017 |

* cited by examiner

DEVICE FOR CONVERSION OF WAVE ENERGY INTO ELECTRICAL ENERGY

CROSS REFERENCE TO RELATED APPLICATION

This application claims priority under 35 U.S.C. 119 to Serbian Application Serial No. 2021/1153, filed Sep. 17, 2021, which is expressly incorporated herein by reference in its entirety.

TECHNICAL FIELD THE INVENTION RELATES TO

The invention relates to the device for conversion of wave energy into electrical energy and the process for its deployment at the exploitation location with the characteristics of the device adapted to the deployment process. The device in relation to the previous solutions differs particularly in the field of energy transfer from the floating body, which moves up and down, to the electric generator that produces electricity. The deployment process is based on the adaptation of the anchoring system at the seabed at the deployment location of the device for conversion of wave energy into electrical energy and having a security system to prevent accidental damage. According to IPC (International Patent Classification) the device is classified into power machines that use energy of sea waves and responds classification symbol F03B 13/12.

TECHNICAL PROBLEM

The technical problem solved by the presented invention is the construction method of the device for conversion of wave energy into electrical energy with maximum efficiency, i.e. the degree of utilization, durability in relation to working conditions and at the same time being made of acceptable materials and acceptable number of sub-assemblies to meet the economy requirements, i.e. to be cost effective.

These problems are well known in the prior art. A cost effective solution is difficult to find. A sustainable solution for the device for conversion of wave energy into electrical energy requires maximum efficiency of the device and at the same time minimum number of materials and minimum number of assemblies so that the system is reliable, safe to operate and inexpensive. The wave forces acting on the floating body moving up—down can be very large as it is known in the prior art requiring a strong supporting structure and a strong chain of elements involved in the transfer of forces from the floating body to an electric generator, for instance. Considering the requirement for mobility of the floating body that is in contact with water this seems to be contrary to the necessity for the construction to be strong enough to withstand high forces of waves used to generate energy, and at the same time to be strong enough to withstand offshore conditions.

The problem of the service life of individual elements that are locally loaded is also a known problem, and this problem is solved so the elements can withstand the loads to which they have been exposed for a longer period of time.

Deep draft problem. The characteristic of devices of this type is that they must be of a large size because they are designed for deep water, the construction of such devices is performed in shipyards that have a very small water depth compared to the required draft depth as it is known to experts in this field.

Devices located offshore are exposed to very harsh atmospheric conditions and frequent and cheap maintenance is necessary, this invention significantly reduces and simplifies this problem.

Devices of this type are not designed to work in very strong storms, this invention solves the problem of securing devices in extreme storms.

This invention solves the problem of transportation the device and its deployment.

The invention also includes a solution for transportation and submersion the anchor that holds this device in the desired position.

The invention also solves the problem of deployment of the device to the exploitation location.

THE PRIOR ART

There are many known solutions based on renewable energy sources. If observed from the perspective of the evident climatic changes on Earth, it seems necessary to avoid the use of power plants that emit harmful gases to the environment as soon as possible. European patent EP 2183478, from the same inventor as in this application, shows a device that solves some of the basic problems associated with the transfer of energy from the waves to the floating body that moves up and down. The amount of energy taken from the waves that can further be converted into electrical energy as described in EP 2183478 is maximized but it is necessary for this device to be competitive with respect to other known devices for transformation of energy and to be able to replace the devices for energy generation that emit large quantities of harmful gases into the atmosphere before climate changes escalate.

Patent WO2017176142A2 of the same inventor has made a lot of progress in the application of such devices but problems with the service life of the transmission system parts have been observed because flexible parts get tired very quickly on small waves, i.e. they crack due to the phenomenon of material fatigue, which is a consequence of the appearance of the load constantly in one place.

Another problem (WO2017176142A2) is that the gear rack solution requires a long pipe and if transported in a vertical position, a large depth of the sea during transport is required. The depth of the sea during transport should be approximately several dozen of meters. There not many places where it is possible. If the device is transported in a downed, horizontal position, the transport to the deployment location and straightening is very complex and expensive.

The floating anchor from the patent (WO2017176142A2) has a drawback because when submerged this anchor is not in an ideal horizontal position, the water inside the anchor can move to one side resulting in a center of gravity disorder and thus the possibility of uncontrolled rotation and overturning of the anchor occurs. Or it requires large balloons, a larger number of divers, people and expensive equipment. Then there is a big drawback during the process of taking the anchor out of the water because at the bottom the pressure increases manifold and when taking the anchor out of the water the air volume increases manifold making the anchor removal difficult, the risk of uncontrolled flying the anchor out of the water increases and there is even a risk of anchor explosion.

The construction of the system is improved, lighter, cheaper and simplified, and thus its efficiency and economy are increased.

DISCLOSURE OF THE INVENTION

The device for conversion wave energy into electricity comprises a supporting structure, the first working body, a system of energy conversion, anchor and anchor cables. The supporting structure tends to float out to the surface of the water, but the anchor cables prevent floating because they are connected to the supporting structure at one end and to the anchor weight at the other end, in this way the whole device is held in position. The first working body is slidably connected to the supporting structure so that it can move up and down along the supporting structure under the action of the waves. The first working body is connected to a motion transformation system via a rigid gear (a rack, a roll rack) positioned above the water surface that is further connected to the second working body via the same rigid gear (a rack, a roll rack). When the first working body moves up and down along the supporting structure it drives the motion transformation system via rigid gears that further drive the second working body located inside the supporting structure.

The essence of the invention is two working bodies, the first working body in contact with the water on which the waves work is connected to the second working body via the rigid gear, in this case the system of a rack and a roll pinion, and the second rack to the second working body allowing many years of operation with minimal maintenance, minimal losses in friction and minimal lubrication.

The Motion transformation system, comprises a system of rigid gears, a roll rack (or gear rack)—a pinion (pinion gear) or a rack gear—a roll pinion system, drive gears that are connected to the gear that is firmly connected to the generator shaft and the system is supplied with power through two branches.

The gear shafts are bedded into a housing, the housing is firmly attached to the support panel to which rigid gear guides are firmly coupled, the guides ensure that all the loads obtained by gearing the rigid gears and gears are accepted preventing separation of the rigid gear from the gear in all directions except vertical which is needed for smooth operation of the device.

The motion transformation system is constructed in such way that the external working body and the internal working body ensure that the rigid gears are loaded to the tension resulting in a less rigid and lighter construction of the rigid gears. This is a novelty and has never been done in this way in any patent before, and this is a condition for the device to be reliable and have a satisfactory service life.

Rigid gears that are integral part of the second working body can be separated from the roll gears. This is an important feature of the invention because it is necessary to provide the lowest possible center of gravity of the mass of the whole system during transport and extreme storms.

The first working body that in contact with water has a feature that its displacement is less than its mass and therefore it cannot be called a floating body because it cannot keep afloat (float) when not connected to the motion transformation system. The difference between the mass and the displacement of the first working body is compensated through roll gears and by means of rigid gears. By applying this technical solution, two very important results are obtained. The first result is that the rigid gears are loaded to stretching. Rigid gears installed in this way are dominantly loaded to stretching allowing them to be lighter, cheaper and considering the large forces caused by waves, they can be made from existing materials due to their large lengths.

The second result is that the first working body can be submerged allowing installation of the device in a safety configuration when extreme storms occur. If the displacement is greater than the mass of the external working body then, when submerged, the mass of the external working body should be increased (i.e. the displacement reduced) by filling the first working body with water, for example, and when the first working body is brought back to the working position the water should be emptied under pressure by a pump, compressed air, and the like, while in this invention the water is automatically disposed when the first working body emerges.

Within the scope of the present invention, a transport body that enables the transport and anchoring by ships having small cranes is presented.

The transport body can be used for transport and deployment on the location of weights, anchors, parts of underwater devices (e.g. tidal energy conversion device, etc.)

The load is attached to the transport body and towed to the desired location then attached to a crane or a suitable device that will put the load to the correct location. Valves are opened allowing water to get into the transport body and at the same time, by opening other valves it is ensured that the air gets out, this compensates for the weight and the difference between the displaced volume and the mass of the weight is reduced to the minimum weight accepted by the crane in the further immersion process. This difference in residual weight that the crane will be loaded by can be finely regulated by means of compression vessels and regulatory valves.

BRIEF DESCRIPTION OF THE DRAWINGS

The device for conversion of wave energy into electrical energy according to the invention will be described below in more detail with reference to the accompanying figures. Attached are the figures that are used for better understanding of the process according to the invention, i.e. the constructional characteristics of the device enabled by the described assembly and the device transport phases. The figures show examples of embodiments of the invention and should not be construed as limitation of other possible embodiments that are within the scope of protection defined by the claims. Technical characteristics according to the claims can be mutually combined in other examples of the embodiments of the structure. The drawings show the following:

DETAILED DESCRIPTION OF THE INVENTION

Figure 1:
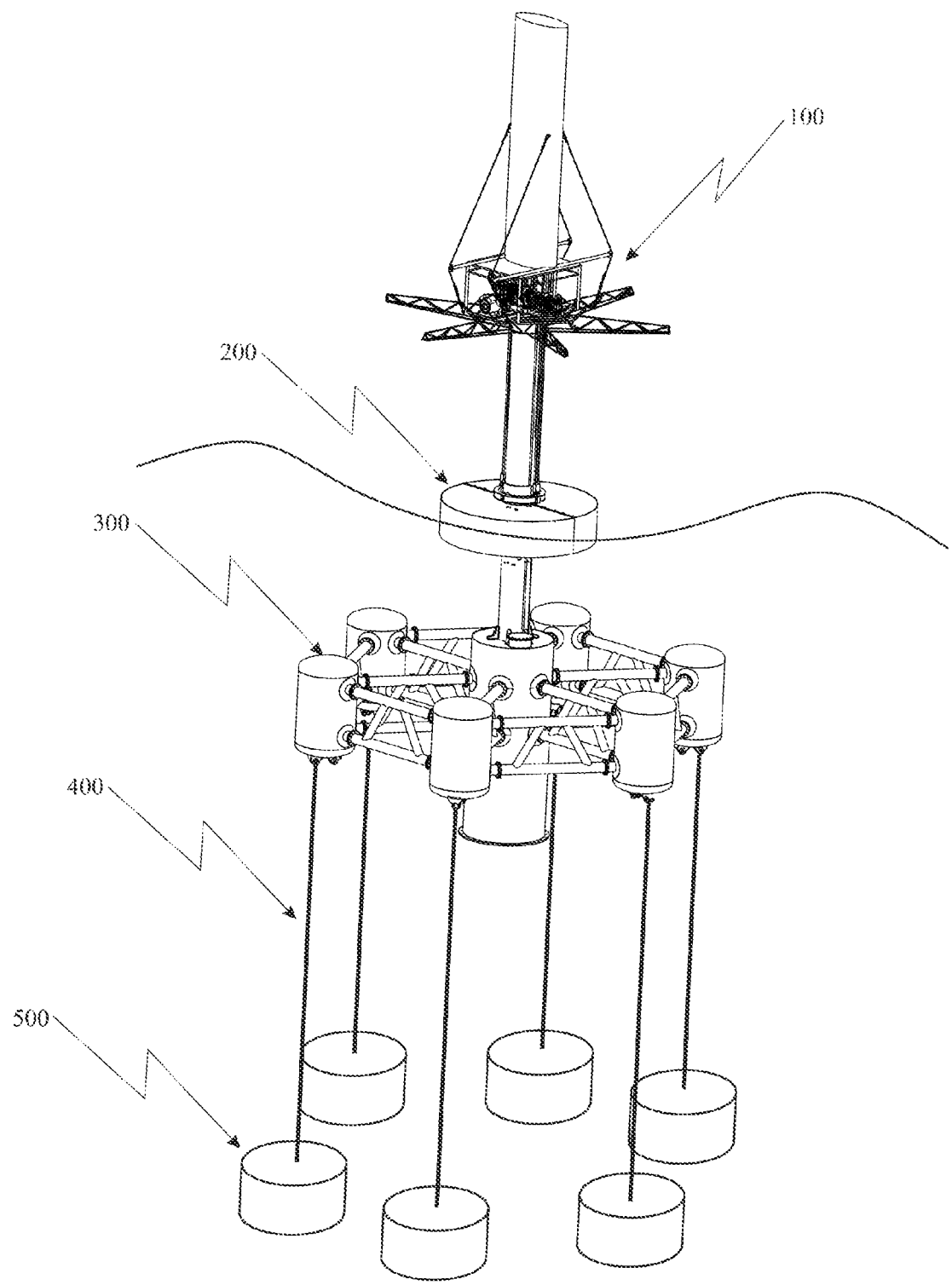
FIG. 1 shows in an isometric view the first example of embodiment of the invention.

FIG. 1 shows a device for conversion of wave energy into electrical energy, the device comprises a supporting structure 300 having a positive displacement—buoyancy force (which is equal to the weight of the liquid displaced by the body immersed in it) reduced for the body weight, a first working body 200, a motion transformation system 100, anchors 500 and anchor cables 400. The supporting structure 300 tends to float on the surface of the water, but the anchor cables 400 that are attached to the supporting structure 300 at one end and to the anchor 500 at the other end do not allow it to flow, in this way the whole device is held in position. The first working body 200 is slidably connected to the supporting structure 300 so that it can move up and down along the supporting structure under the action of waves.

Figure 1A:
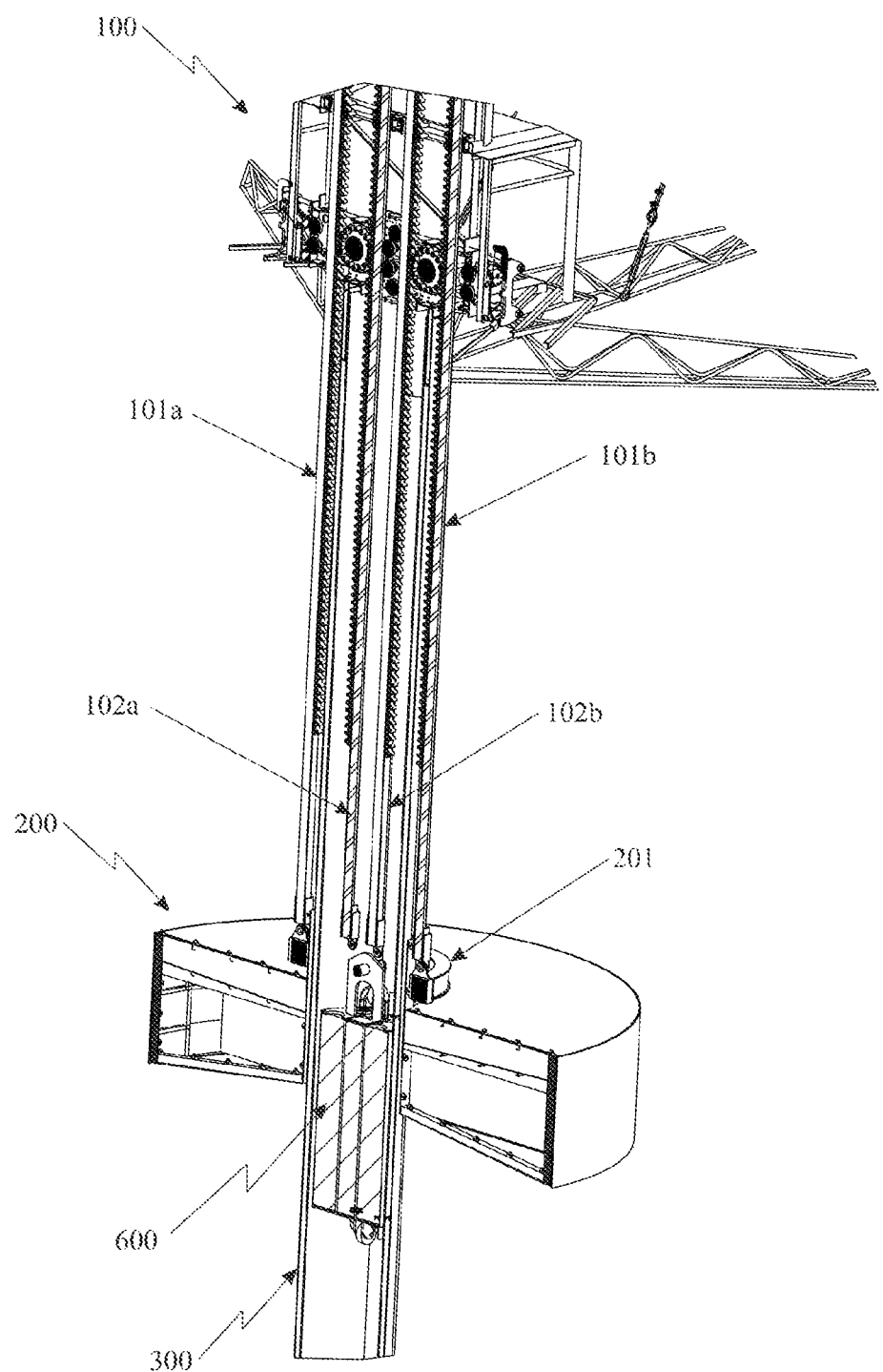
FIG. 1a shows in an isometric view and partial cross-section an example of embodiment of the invention.
Figure 2:
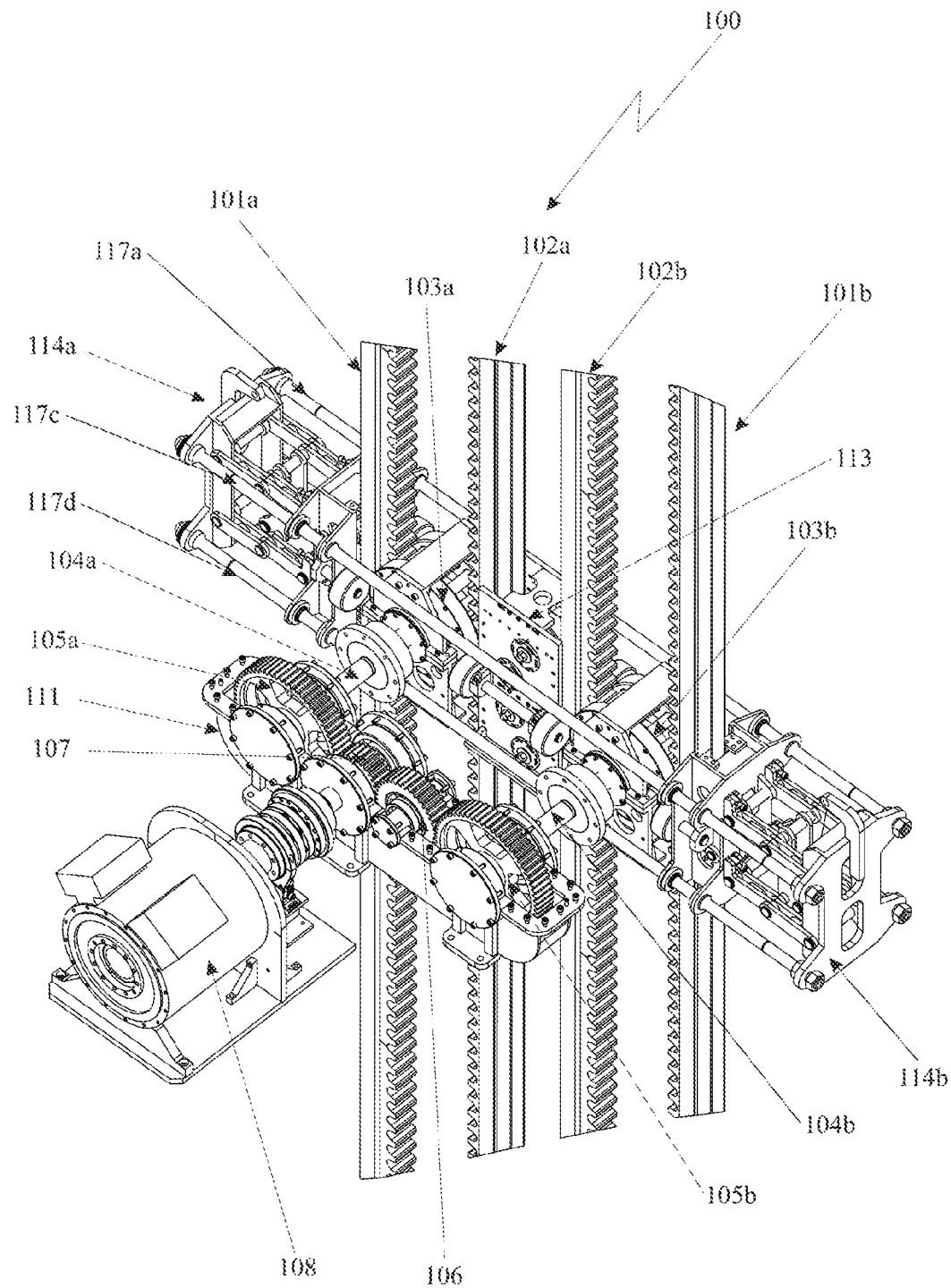
FIG. 2 shows in an isometric view an example of embodiment of the motion transformation system.

FIG. 1a shows the inner part of the device for conversion of wave energy into electrical energy. The first working body 200 to which a rocker or pivot 201 is articulated and is used for balancing forces in rigid gears or first vertically oriented rigid gear racks 101a and 101b that are at one end articulated or connected to the rocker 201, rigid gears 101a and 101b are further connected to the motion transformation system 100 for transformation of motion and rigid gears or second vertically oriented rigid gear racks 102a and 102b are attached to it, their other end is connected to the second working body or counterweight 600 that is slidably connected to a vertical support tower of the supporting structure 300. As shown in FIGS. 1a and 2 the rigid gears 102a and 102b are generally parallel to the the rigid gears 101a and 101b. When the first working body 200 moves up and down along the vertical support tower of the supporting structure 300 it drives the motion transformation system 100 for transformation of motion via the rigid gears 101a and 101b that further drive rigid gears 102a and 102b together with the second working body 600 located inside the vertical support tower of the supporting structure 300 slidably led inside the fixed guides on the supporting structure 300.

The first working body 200 and the second working body 600 are rigidly connected via rigid gears 101a, 101b, 102a and 102b, picturesquely described as "two-scale scales". Thus connected working bodies are unbalanced by a relatively small wave force making the system efficient. Then the second working body 600 pulls the first working body on the surface of the water by its weight and it has a smaller draft so it comes to the zone of higher wave energy since it is known that wave energy decreases exponentially with water depth. The first working body 200 under the action of higher wave energy transfers more energy to the system all the way to the generator and a larger amount of electricity is generated and the whole system is more efficient. That is the beauty of the invention.

FIG. 2 shows one example of embodiment of the motion transformation system 100 that converts linear motion of rigid gears into alternating circular motion of a generator 108 and the system consists of rigid gears 101a and 101b that can be racks, roll racks and the like coupled with the gear 103a and 103b with rolls and also known a pinion gear (For example- Roll pinion, from GB 2555854A in case of application of roll racks) respectively, gear with rolls 103a is firmly attached to the shaft 104a while the gear with rolls 103b is firmly attached to the shaft 104b, at the other end of the shafts 104a and 104b gears 105a and 105b are tightly connected, gear 105a is toothed with the gear 107 that is firmly attached to the shaft of the generator 108, gear 105b is toothed with gear 106 that is further toothed with gear 107. When the rigid gears 101a and 101b move upwards gears 103a and 103b with rolls rotate to drive gears 105a and 105b via shafts 104a and 104b, gear 105a drives gear 107 directly, while gear 105b drives gear 107 via gear 106. Gear 106 serves to change the direction of rotation. It ensures that the output gear 107 is supplied with torque from two sides that has same direction and intensity and which is added obtaining twice the output torque, if there were no gear 107, the torque on its left side and the torque on its right side would be subtracted and being of the same intensity, the resulting moment would be equal to zero and the system would therefore not be able to work.

One type of multiplier is presented in order to show the possibility of device operation.

Shafts 104a and 104b are bedded in the housing 111, gears 105a, 105b, 106, and 107 are also located and bedded with their belonging shafts into the housing 111. The housing 111 is firmly attached to the supporting structure 300 (FIG. 1). Sliding guides 117a, 117b (FIG. 3), 117c and 117d are firmly attached to the central guide 113 that is firmly coupled with the supporting structure 300 (FIG. 1). At the ends of the sliding guides 117a, 117b (FIG. 3), 117c and 117d the housing 114a of lever mechanism is firmly connected at one end and the housing 114b of lever mechanism at the other end of guides 117a, 117b (FIG. 3), 117c and 117d, via belonging levers (FIG. 3) the guides 116a and 116b of the rigid gears 101a are connected and slidably attached to the slide guides 117a, 117b (FIGS. 3), 117c and 117d, the guides 116a and 116b of the rigid gears provide that the rigid gears 101a and 101b smoothly couple with the gear 103a and 103b with rolls and thereby accept all the loads obtained by coupling the rigid gear with 101a and the gear 103a and 103b with rolls thus preventing separation of the rigid gear 101a from the gear 103a in all directions except the vertical that is necessary for the smooth operation of the device.

The characteristic of this embodiment is that the loads that occur due to the coupling of the rigid gears 102a and 102b and gears 103a and 103b with rolls are mutually balanced on guide 113 and the loads transmitted to guides 117a, 117b, 117c (FIG. 3) and 117d provide their permanent load to tension (this type of load is most suitable in terms of strength and dimensions of the guides known from the prior art).

The characteristic of this system is that the loads are brought from two sides and they are taken away from only one side through the generator gears so this transformation of power and movement can be achieved with much smaller and simpler parts that are lighter and contribute less to inertial loads.

On the other hand, the motion transformation system 100 is designed in such way that the first working body 200 and the second working body 600 (FIG. 1a) provide constant load to tension of rigid gears 101a, 101b, 102a and 102b requiring less strength and thus easier construction of rigid gears.

It is possible to install systems for balancing of rigid gears 101a and 101b when attaching to the first working body 200 and balancing of rigid gears 102a and 102b when attaching to the second working body 600, such as a rocker, a lever system, a sprocket with a chain and hydraulic balancers and the like.

Figure 3:
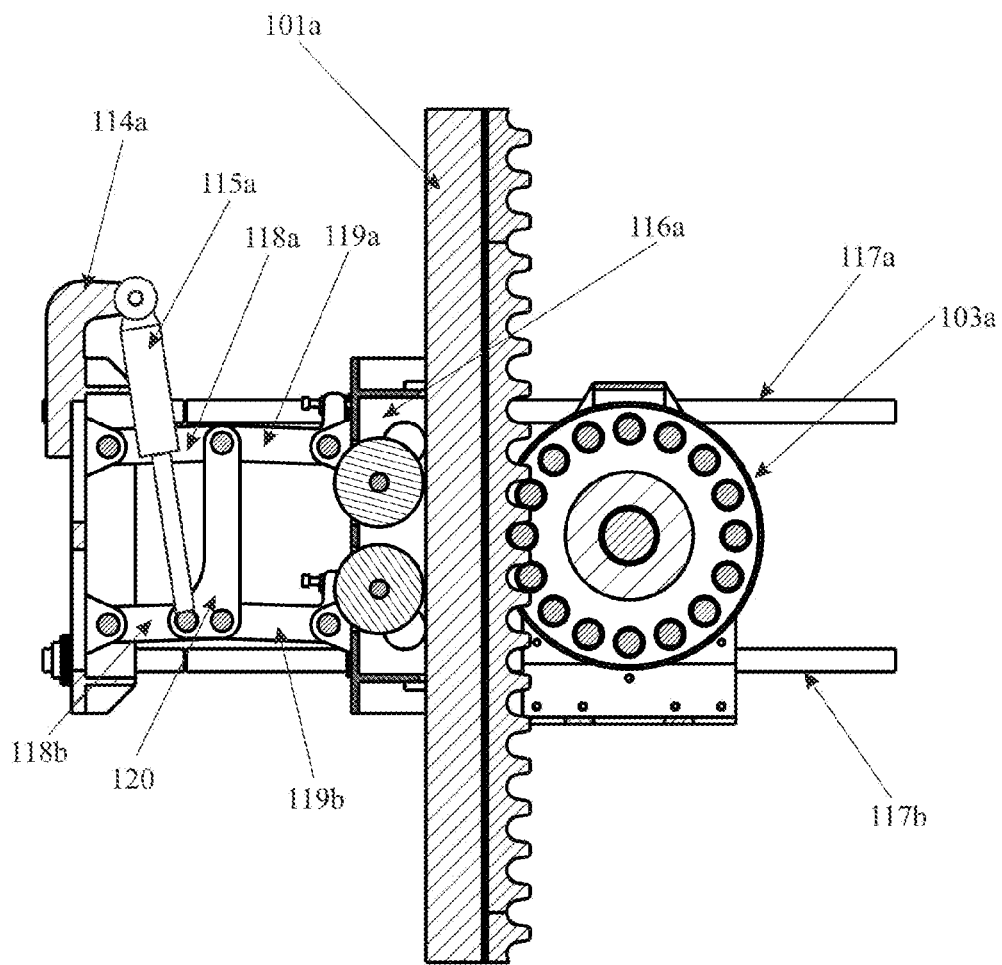
FIG. 3 shows, in cross-section, a mechanism for separating racks from roll gears in the closed position.

FIG. 3 shows a lever mechanism for separating rigid gears from pinions. FIG. 3 shows only one side of this system while the other side is identical and placed as a reflection in a mirror.

There are two ways of releasing rigid gears from the gears with rolls, one as described below and the other one is by pulling rigid gears out of the grip by providing a system that returns the rigid gears to the grip of the gear with rolls.

A mechanical system is described here in order to illustrate the possibility of embodiment of the invention. Instead of the described system, a hydraulic, electromechanical, pneumatic systems or their combination can be installed with the same task to separate or pull out the rigid gear and gear with rolls from the grip.

The system comprises fixed guides 117a and 117b having the housings of the lever mechanism 114a firmly attached at the ends, 114a at one end and 114b at the other end (FIG. 2). The levers 118a and 118b are pivotally connected to the lever housing mechanisms 114a at one end while they are pivotally connected to lever 120 and levers 119a and 119b at the other end, the other end of the levers 119a and 119b is pivotally connected to rigid gear guide 116a that is slidably connected to guides 117a and 117b. The lever 120 is pivotally connected at one end to the cylinder 115a that is pivotally connected to the housing of the lever mechanism 114a at the other end.

Figure 3A:
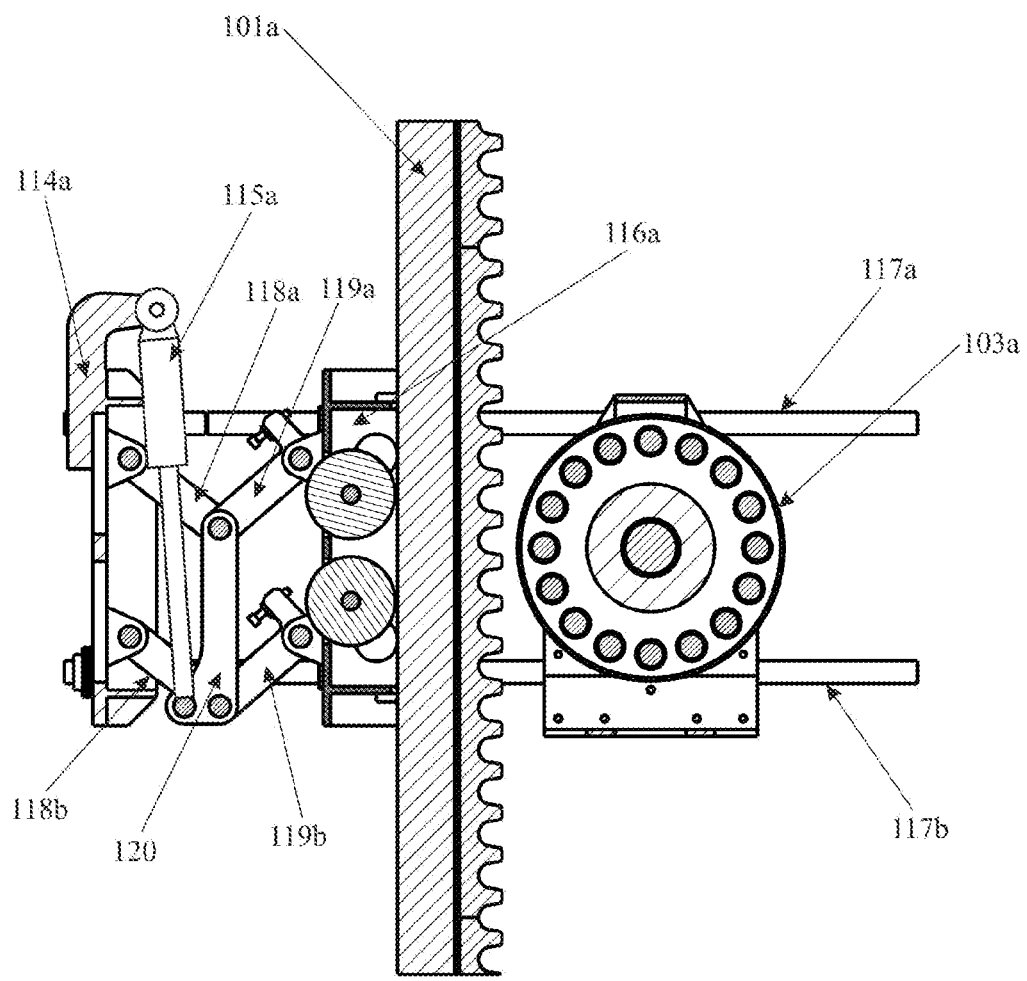
FIG. 3a shows, in cross-section, a mechanism for separating racks from roll gears in the open position.

The mechanism for separating rigid gears in the open position is shown in FIG. 3a. By extending the cylinder 115a the lever 120 moves along a circle with the radius that corresponds to the length of the levers 118a and 118b, by moving the lever 120 levers 119a and 119b are also moved and thus the kinematic chain is satisfied resulting in rotational movement of the levers 119a and 119b and translational movement of the rack guide 116a along guides 117a and 117b which pulls the rigid gear 101a and separates it from the gear 103a with rolls. Returning the rigid gear 101a to the working position, i.e. coupling with the gear 103a with rolls is achieved by retracting the cylinder 115a and thereby the system is returned to the operating position.

It is calculated that the device is configured in the security mode during transport to the anchoring location. The safety mode is characterized by the fact that the position of the center of gravity of the entire system is at a minimum distance from the lowest point of the supporting structure of the device.

Figure 3B:
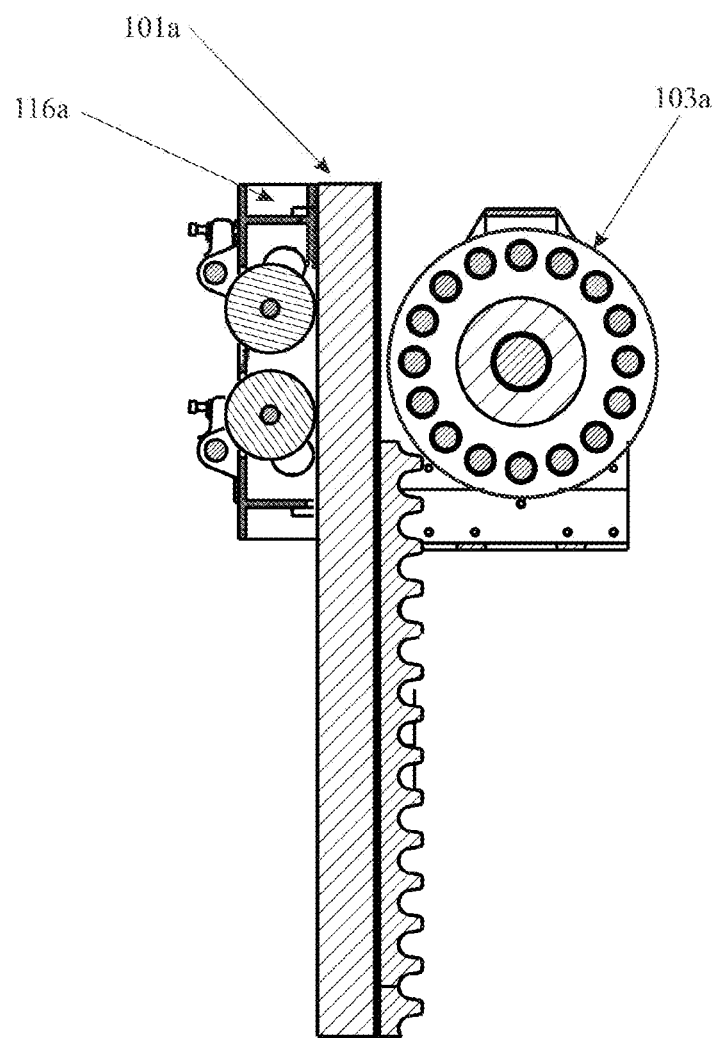
FIG. 3b shows, in cross-section, another method of performing the release of the rack from the roll gears by a pull-out system.

FIG. 3b shows another way of separating the rigid gear 101 and the associated gear 103a with rolls by simply pulling the rigid gear 101a out of the grip of the gear 103a with rolls. This is achieved by making the rigid gear 101a a little shorter than the stroke of the working body 200 (from FIG. 1). In this way, it is necessary to forcedly ensure the lifting of the working bodies when bringing them back into the working mode.

Figure 4:
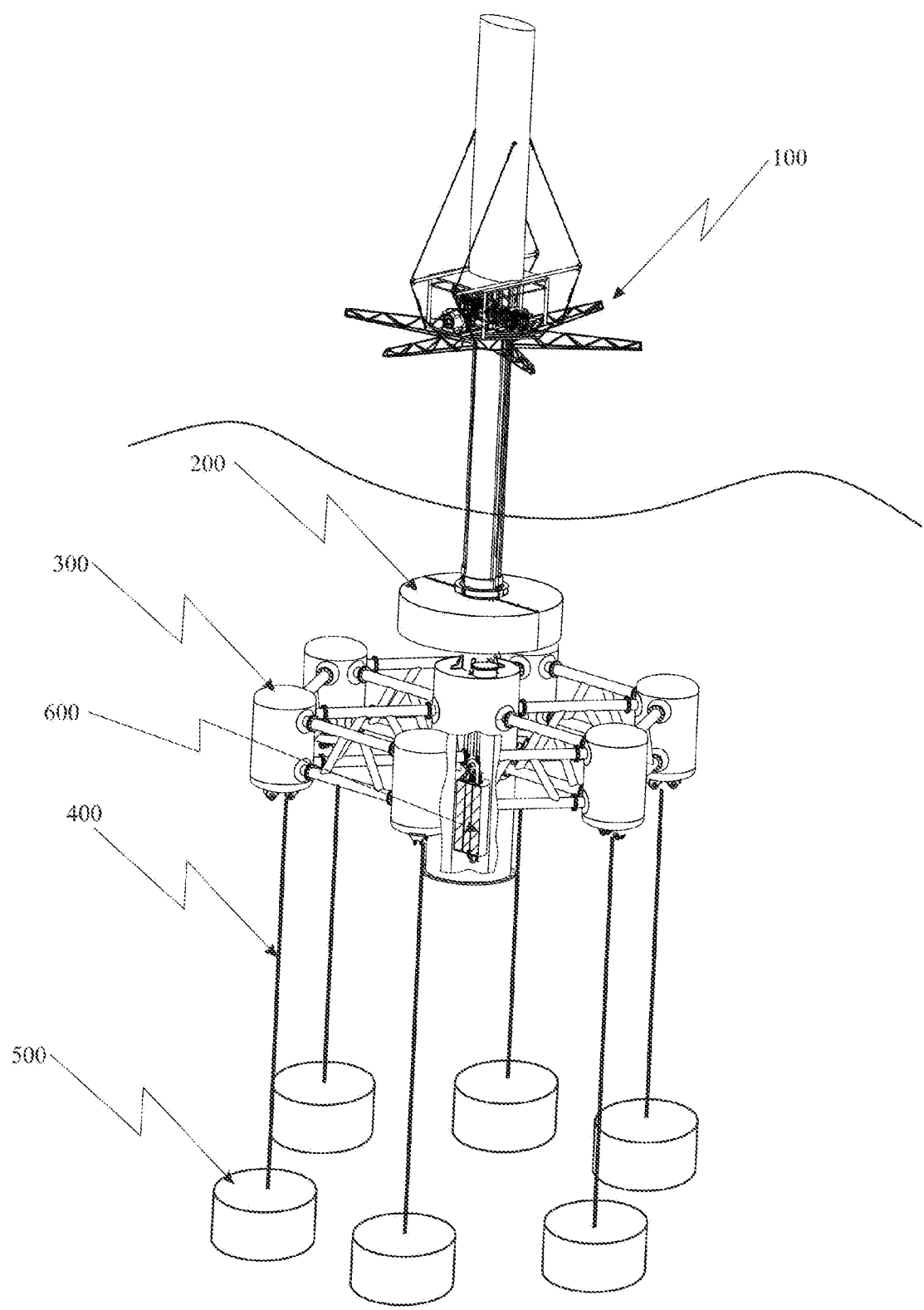
FIG. 4 shows in isometric view an example of embodiment of the invention when configured in the safety mode.

FIG. 4 shows the device configured in safety mode.

The configuration of the device for conversion of wave energy into electrical energy into a safety mode comprises lowering the first working body 200 so that it rests on the supporting structure 300 and then lowering the second working body 600 to the lowest predicted position.

The procedure for configuring the device in safety mode is as follows: the generator is programmatically set to motor mode, the second working body 600 is raised over the rigid gears 102a and 102b to the position where the first working body 200 leans on the supporting structure 300, the generator then stops and holds the second working body 600 in the upper position, from this moment the process of separation of the rigid gears begins (as previously explained), after completion of the cycle of separating the rigid gears the second working body 600 is lowered to the lower position by the generator.

The system in the safety position has the lowest center of gravity and is ready to withstand the strongest storms.

When submerged to the lower point the working body 200 can be easily locked mechanically, electrically, hydraulically, pneumatically or by some of the systems so as not to move during strong storms.

It is possible to detach rigid gears 102a and 102b or simply the rigid gears 102a and 102b come out of the grip with the gears 103a and 103b with rolls.

After the storm ended, the second working body 600 is raised by pneumatics, hydraulics or mechanics and the rigid gears 102a and 102b with rolls are coupled with the gear 103a and 103b with rolls and then the second working body 600 is raised to the upper position by generator and the rigid gears 101a and 101a couple with the gear 103a and 103b with rolls, then the second working body 600 is in controlled manner lowered by generator to the middle position and the system is back to standard mode.

Figure 5:
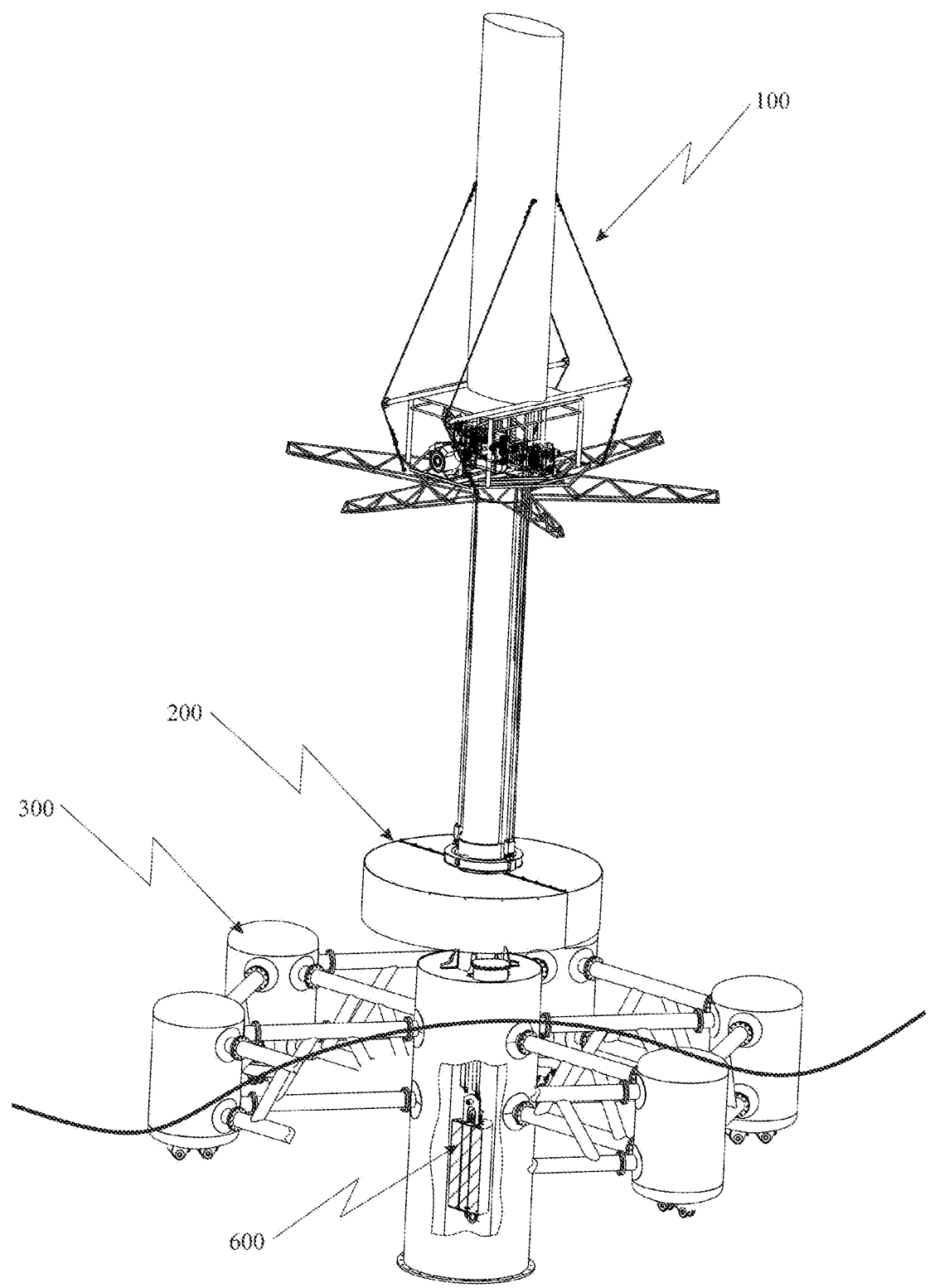
FIG. 5 shows in isometric view an example of embodiment of the invention when configured for transport.

FIG. 5 shows the position of the transport device, this position corresponds to the safety position (FIG. 4) with the difference that during transport the device is not anchored to the seabed but floats freely on the water surface.

It is important to emphasize that lowering the weight during transport is necessary so that the device for conversion of wave energy has sufficient stability provided by the lower position of the center of gravity of the device. The entire motion transformation system is placed on top of the structure and above the water which raises the center of gravity of the structure itself and when the second working body is in the working position it is high above the water and makes the device structure unstable. When the second working body is lowered towards the bottom of the structure the center of gravity point is lowered so that it approaches the buoyancy point and better stability is achieved.

In the operating configuration of the device for conversion wave energy into electrical energy as shown in FIG. 1, the center of gravity is in the upper part of the structure 300 because the center of mass of the first working body 200 and the center of mass of the motion transformation system 100 are above water. In this case, the stability of the device is not endangered because it is anchored by the anchor 500 by means of anchor cables 400 and the whole structure 300 has its buoyancy which tends to push the structure 300 to the water surface so that the forces in the anchor cables 400 provide a stable balance position of the device for conversion wave energy into electricity.

Embodiment of such a construction has a number of advantages over the previous solutions mentioned in the prior art. The first significant advantage is that the construction does not require a large depth of water during transport because it practically has a very low draft. On the other hand, the motion transformation system is located above the water and is available for service, replacement and regular maintenance. The motion transformation system can be replaced entirely with relatively small load capacity cranes that can often be found on smaller ships. Also, personnel, technicians performing the service do not have to enter the structure to do the servicing, but they do it all from the outside of the structure.

TLP (tension leg platform) platforms are convenient because they provide verticality of the device in standard operation but they require great forces in the anchor cables to avoid kneeling, i.d. loosening of the anchor cable that causes the device to lean over, and then during tightening, extreme forces in the anchor cables occur.

In order to avoid these extreme forces, the displacement is increased, i.e. the static force in anchor cables. This results in expensive devices and extra high forces in the cables that are very often on the limit of current technological materials, a larger number with expensive balancing is used.

This phenomenon of extreme increase can be avoided by installing a shock absorber to alleviate the impact forces when tightening after kneeling. These shock absorbers are expensive and difficult to rely on due to their operation in water and great forces.

A reliable and inexpensive novelty consisting of one or more weights is presented here. Namely, the first weight has the mass of our choice, always larger than the static one and has a stroke until it attaches the second weight or a fixed point. The second weight has a free stroke, i.e. it can raise until it attaches the third weight or fixed point.

Figure 6:
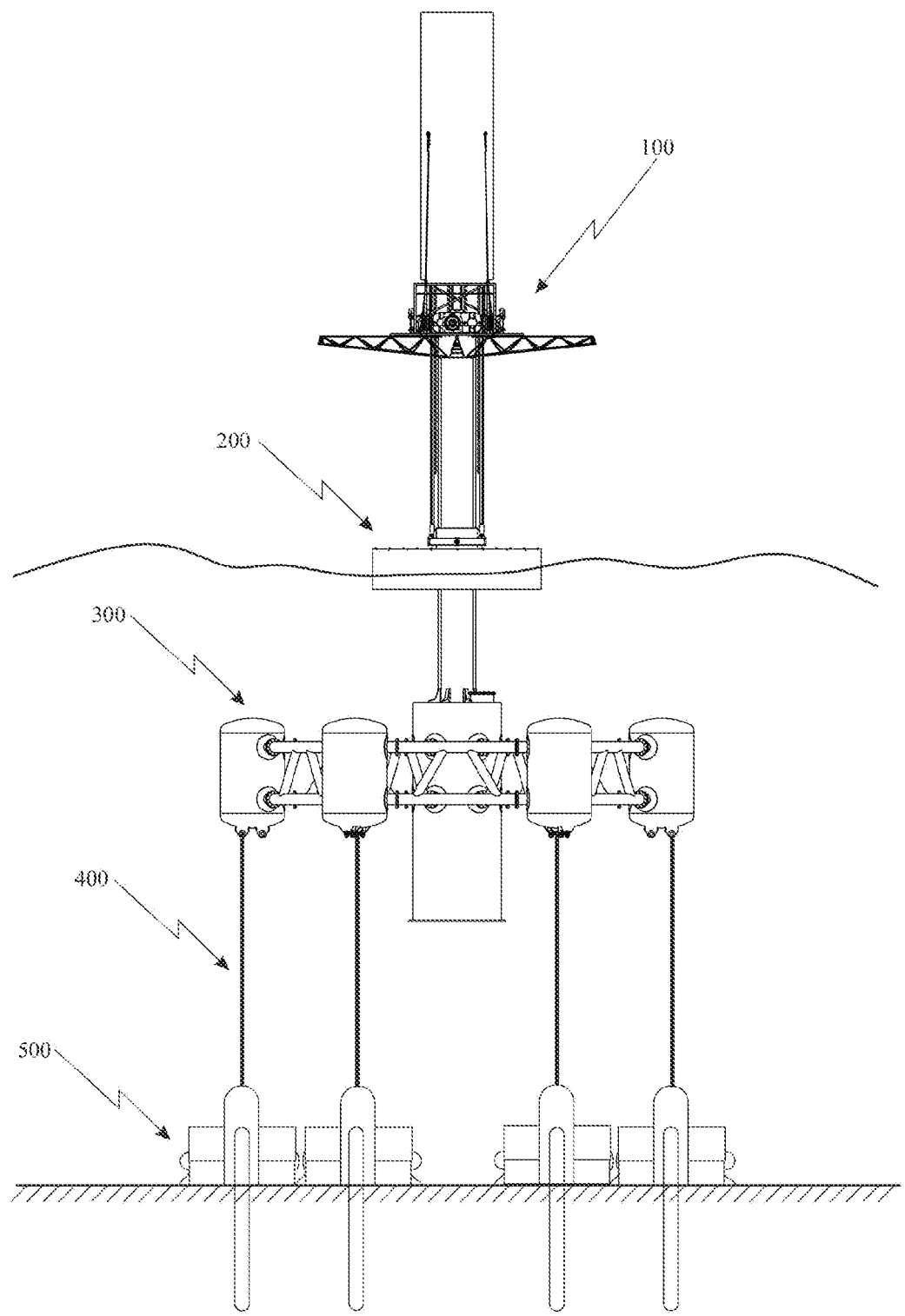
FIG. 6 shows another example of embodiment of the device with a damping anchor.
Figure 6A:
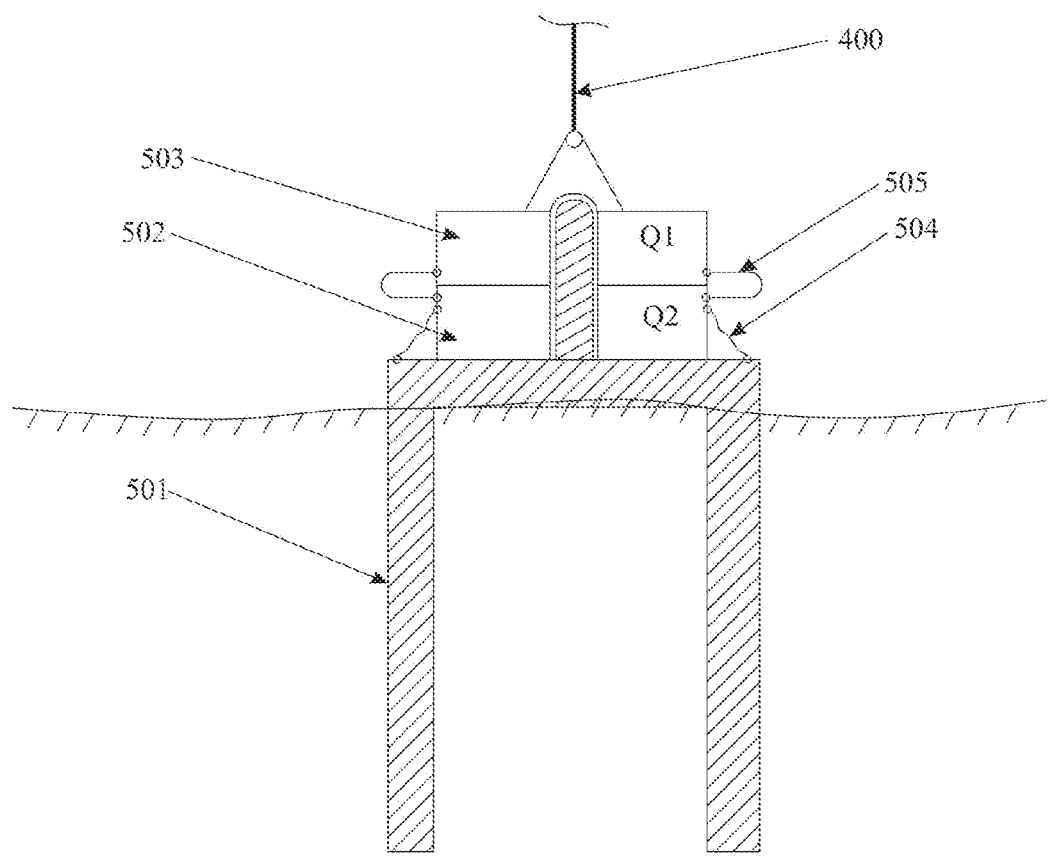
FIG. 6a shows a damper at the anchor.

FIGS. 6 and 6*a* show the anchoring system of the device for the conversion of wave energy into electrical energy with anchors. The anchoring system consists of a tube 501 vacuum-pressed into the seabed, on the tube 501 a weight 502 is placed and connected by a chain (or cable) 504, on the weight 502 a weight 503 is placed and coupled with the weight 502 by a chain (or a cable) 505.

When kneeling happens, a dynamic force occurs in anchor cable 400 as a consequence of the inertia of the system displacement and it raises the weight 503 first that has Q1 mass, after the weight 503 is lifted it slows down the structure until the chain 505 is tightened, when the chain 505 is tightened the weight 502 lifts up and continues to move upwards together with the weight 503 until the chain 504 is tightened.

Operation principle: when the anchor cable 400 is loosened, after the wave force has stopped, the device returns to the standard position with some acceleration and speed. Due to the large mass and acceleration after kneeling the system tends to return to balance position whereby extreme forces are generated because the stopping time is extremely short. To increase the stopping path of the device, (i.e., to extend the time interval of the deceleration) a shock absorber is added. By choosing number and mass of the weights and their free strokes a satisfactory force after kneeling in anchor cables can be achieved. This is a reliable and inexpensive way to control forces after kneeling.

Figure 7:
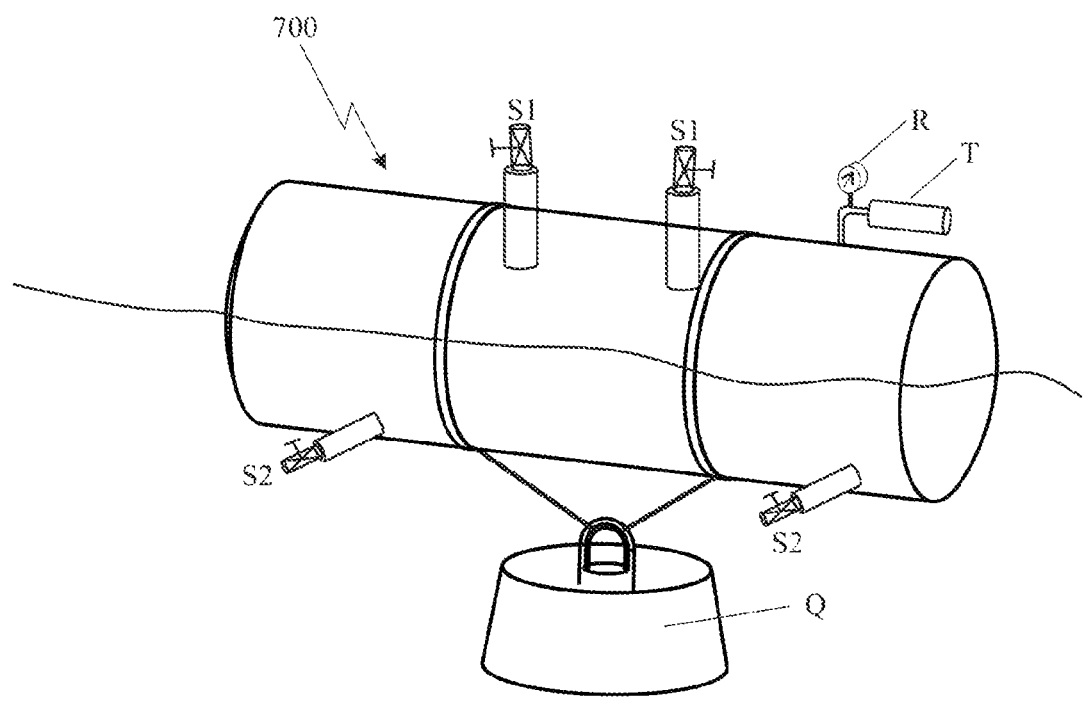
FIG. 7 is a schematic view in isometry of the transport body.
Figure 7A:
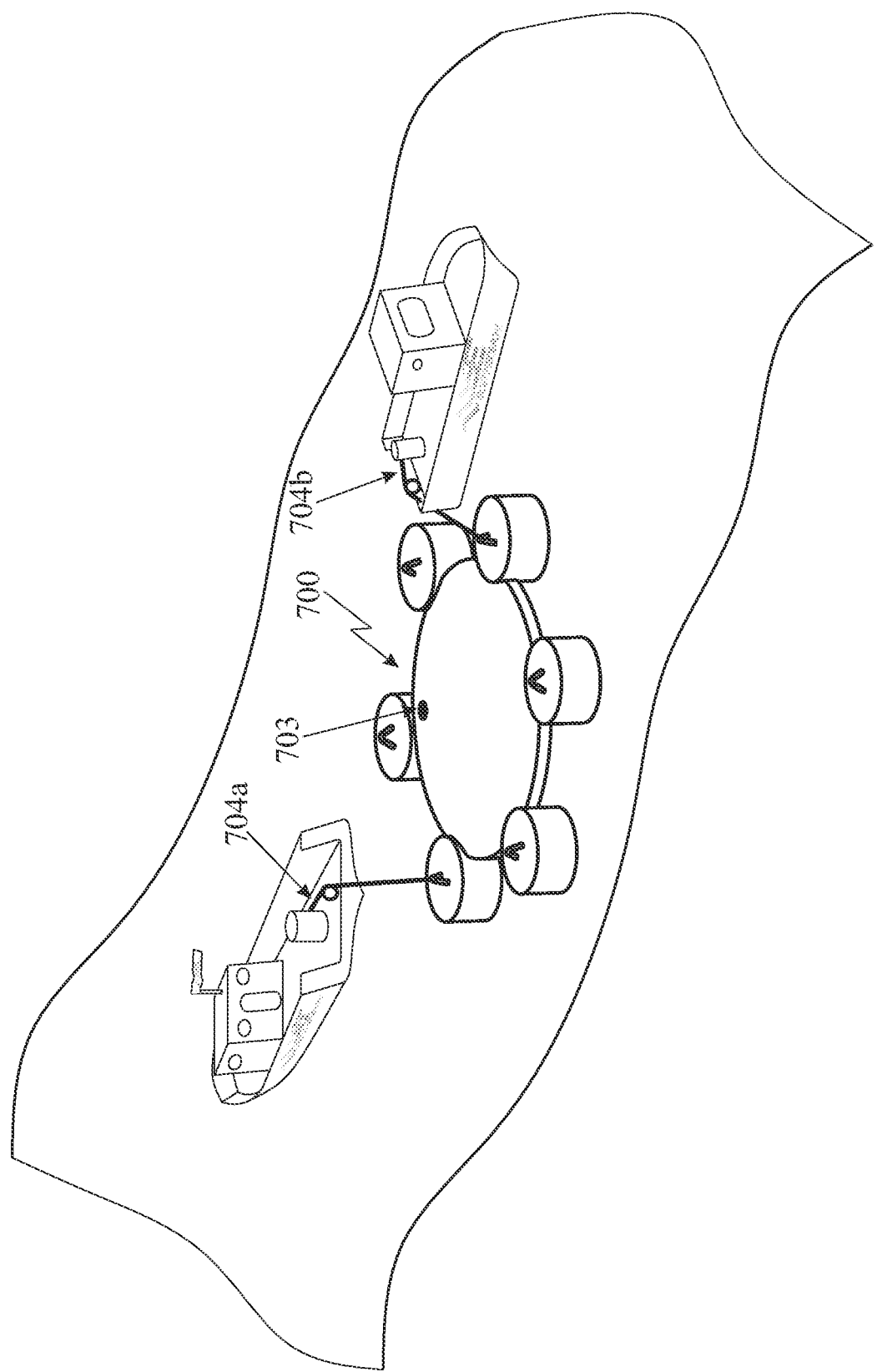
FIG. 7a shows schematically in isometry the anchor platform.
Figure 7B:
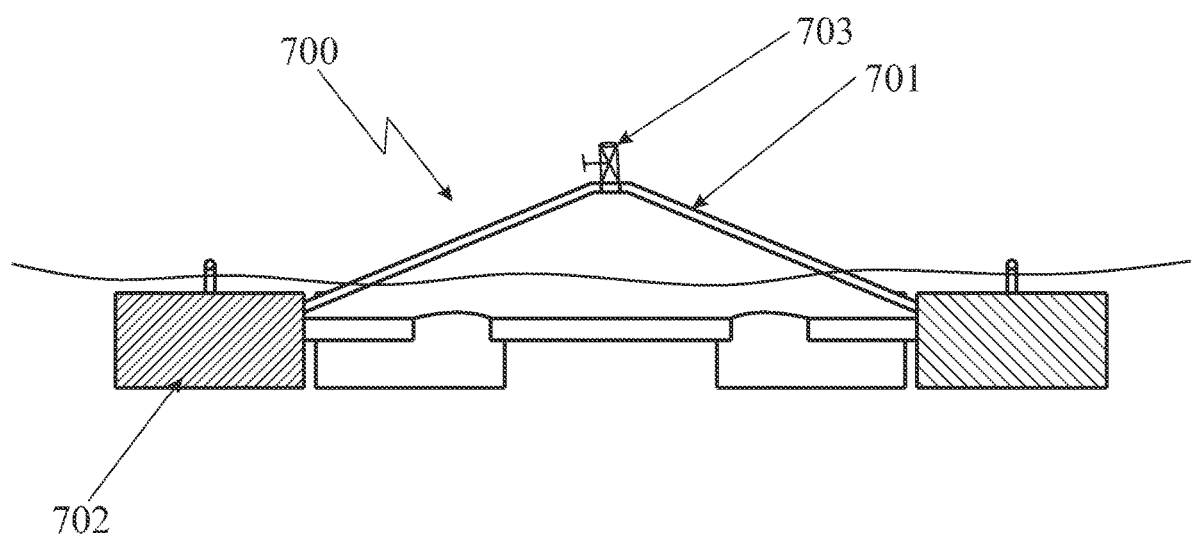
FIG. 7b shows a cross section of the anchor platform.

A transport body 700 as shown in FIG. 7 is used for transport and placement of weights, anchors, parts of underwater devices on the location.

On the transport body 700, there are valves S2 for releasing water inside the transport body 700 and valves S1 for releasing air, a crane with a lower capacity than the weight of the load Q that is lowered to the bottom is used, on the transport body 700, when the load is lowered to greater depths where hydrostatic pressures on the formwork of the transport body is higher, in order not to make a thick, heavy and expensive formwork, the regulation valve R and the tank T with compressed air are installed to enable the relief of the formwork of the transport body 700 which is exposed to external pressure.

The load Q is attached to the transport body 700 that can float together with the load Q and transport body 700 is towed to the desired location by a ship, then attached to a crane or a suitable device, a cable or the like to place the transport body 700 to the correct location. Valves S2 open and water flows inside the transport body 700 and the excess air exits through valve S1 until the transport body 700 starts to sink, then the valve S1 shuts, valve S2 shuts so the speed of the load that is lowered could be controlled by means of a crane for example, in case when a small crane is used for diving, the diving speed has to be controlled, then a regulation valve with an accompanying tank of compressed air is installed. With increasing depth, the surrounding water pressure increases and exerts pressure on the formwork of the transport body 700, so that the formwork does not deform, compressed air from the tank T is inserted inside the transport body 700 to equalize the internal and external pressure. When the load Q touches the bottom, the valve S2 is opened so that the water enters again inside the transport body 700 and at the same time the valve S1 opens so that the compressed air of the same pressure as the external hydrostatic, can exit until the water level inside the transport body reaches the height to which it is valve tube S1 was installed preventing further air leakage. The height of the valve tube S1 is calculated in such a way as to provide a sufficient volume that can lift the transport body 700 from the bottom but now without the additional load Q. The filling of the transport body 700 with water after immersion has to be done because otherwise the transport body 700 would, after detaching the load Q, suddenly move towards the surface of the water due to the large difference between its own weight and submerged volume, in order for this not to happen, the transport body 700 must be filled with water, that is, the excess air must be expelled in the described manner In the case of submersion of the transport body 700 when the speed of lowering is not important then the valve S2 remains open and in that case the pressure inside the transport body and outside is the same, provided that the valve S2 is of a suitable diameter to allow enough water to enter the transport body to equalize the pressure at dive.

The lifting of the transport body 700 from the bottom is performed by disconnecting the load Q after filling the transport body 700, the transport body 700 at that moment begins to move towards the surface of the water, as the transport body 700 approaches the free surface of the water, the pressure on the external part of the formwork of the transport body 700, pressure regulation inside the transport body 700 is carried out by controlled release of water through valves S2 and air through valves S1.

Figure 8A:
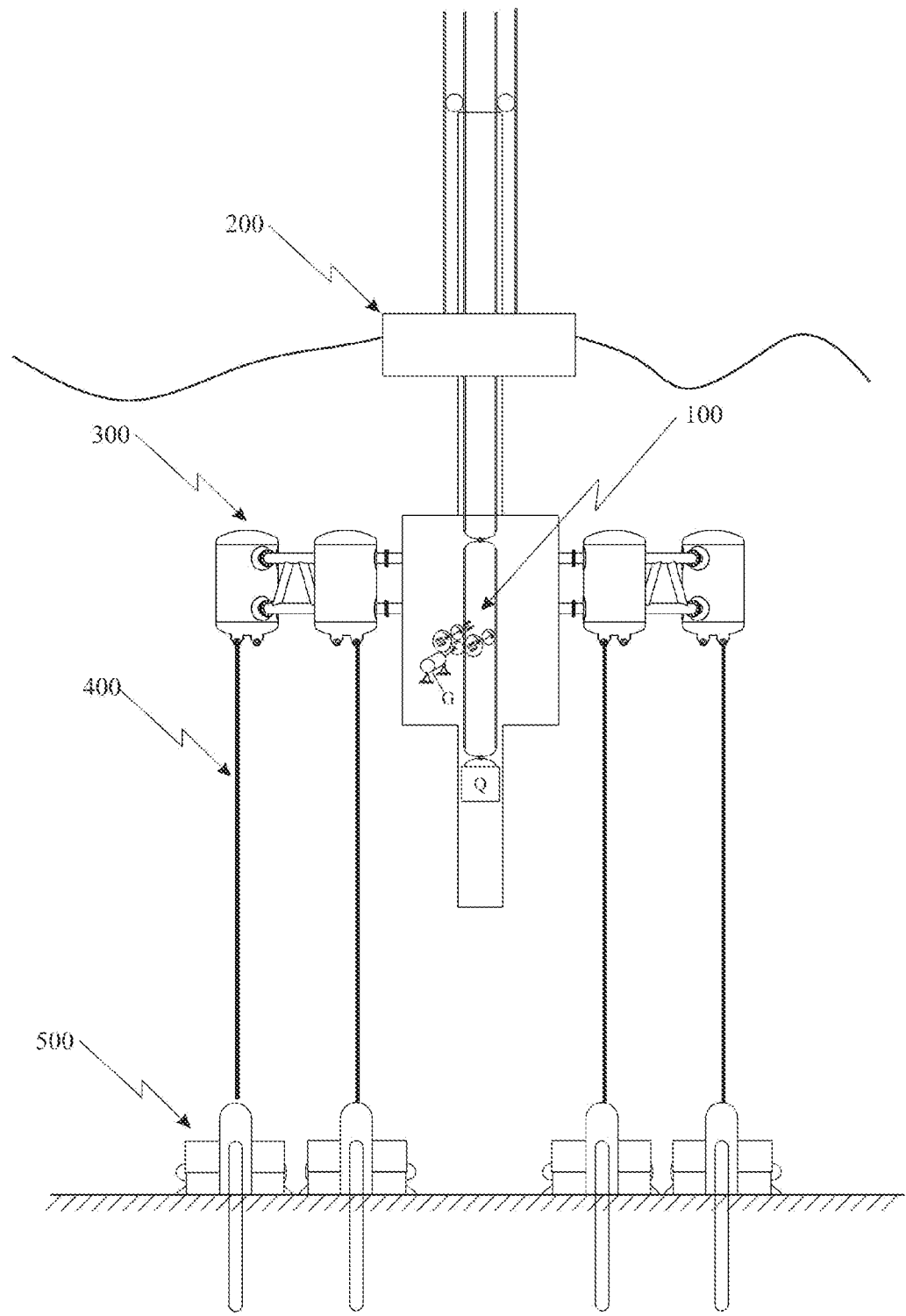
FIG. 8a is a front view of the system where the generator is located below the water surface inside the system

FIG. 8*a* is a schematic view of a generator with an associated multiplier system inside the structure 300 below the water surface. The advantages of this system are lower center of gravity of the whole system, greater working stability, possibility of simpler and more economical multiplier, easier and simpler cooling of the system, and the like. The main disadvantages are longer rigid gears 102*a* and 102b, more difficult access and servicing and more difficult transportation to the device location and bringing it to an upright position.

Figure 8B:
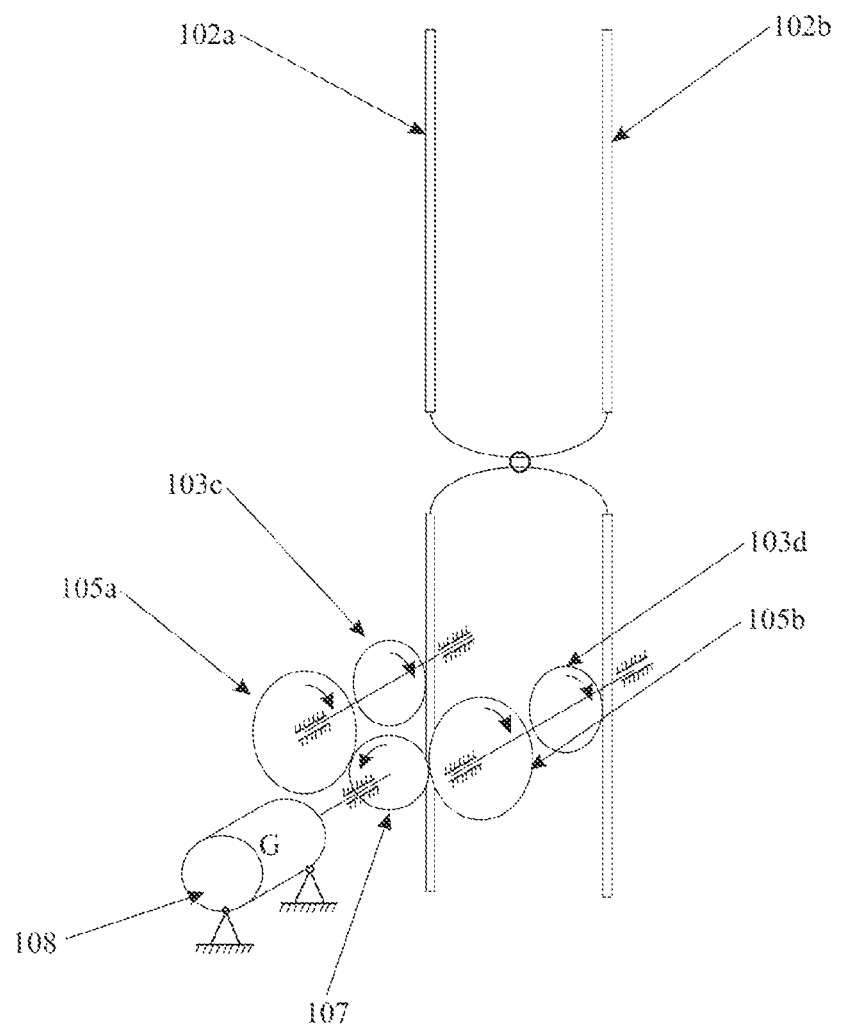
FIG. 8b is a schematic view of a simpler multiplier

FIG. 8b is a schematic view of a simpler multiplier. The multiplier consists of rigid gears 102a and 102b which are coupled with gears 103c and 103d with rolls, gears 103c and 103d with rolls are firmly connected via shafts to gears 105a and 105b which are simultaneously coupled with gear 107 which is tightly connected to the rotor of the generator 108.

During translational movement (up or down) of the rigid gears 102a and 102b, the gears 103c and 103d with the rolls rotate in the same direction because the rigid gears 102a and 102b are placed on the same side of the gears 103c and 103d with the rolls in relation to their axes of rotation.

With this multiplier, a gear for changing the direction of rotation should not be used, as in the case described in FIG. 2, because the rigid gears 102a and 102b in this configuration are placed on the same side of the gears 103a and 103b with rolls in relation to the axis of rotation of the gears 103a and 103b with rolls.

Figure 9:
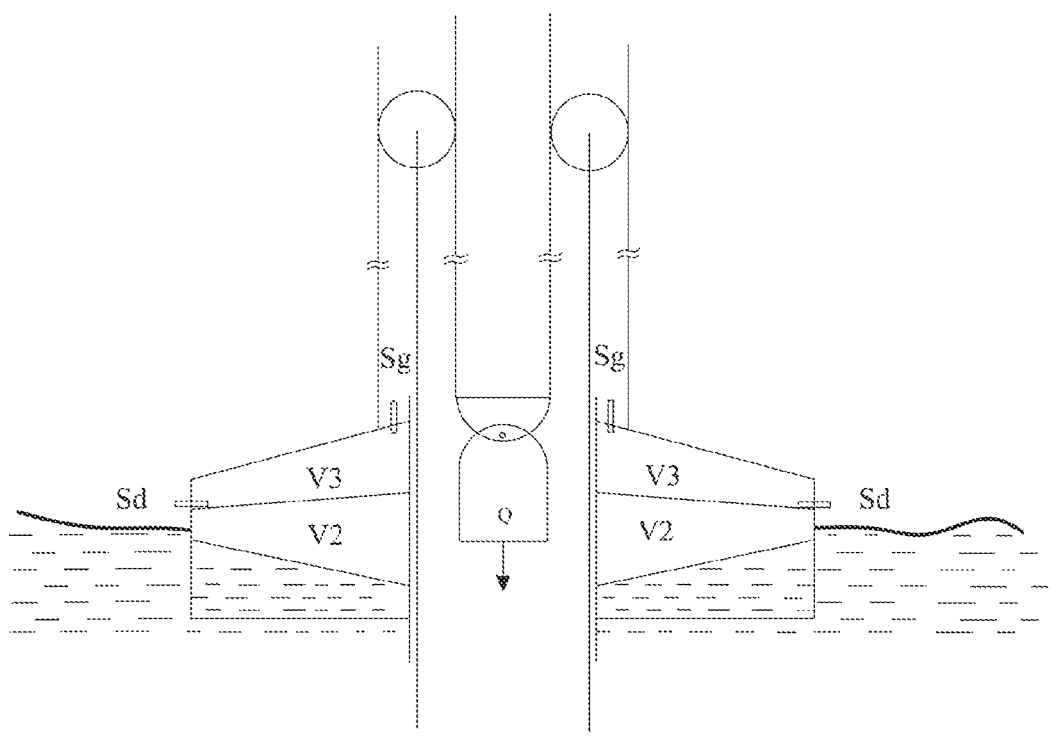
FIG. 9 is a schematic front view of the first working body with the enlarged free side
Figure 9A:
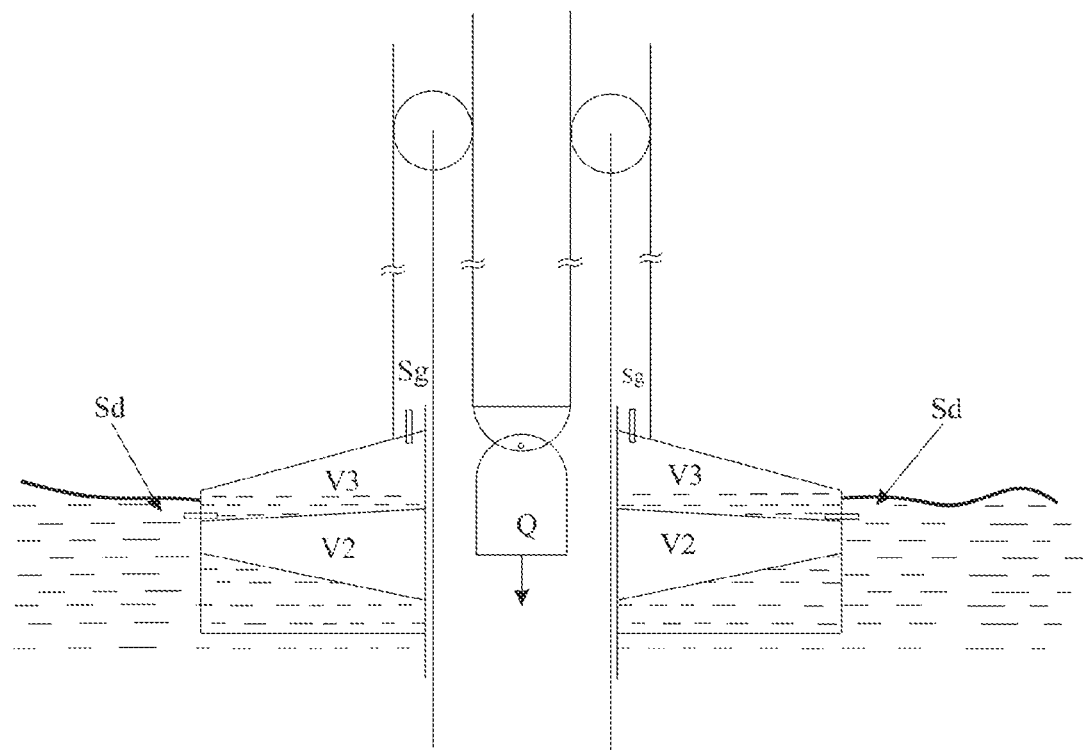
FIG. 9a is a schematic front view of the free discharge of water from the chamber.

FIG. 9 shows the first working body 200 with an added chamber V3 in the working position during operation. The first working body 200 is attached to the second working body 600 via the motion transformation system 100 (FIG. 1a) so that the first working body 200 is towed to the zone with the maximum wave energy, i.e. near the top of the water surface. The tendency is to increase the amplitudes of the movement of working bodies and thus increase the amount of obtained electricity. The increase of the amplitude of the movement of working bodies can be achieved by bringing the system into resonance or approaching the resonance zone, this can be achieved by increasing the free side of the first working body 200 (Fig. 1a) without compromising its bringing to a safe position because its displacement has been increased as described here.

The additional chamber V3 is placed on the first working body 200 from the upper side so that the valves Sg are further above the water surface and the valves Sd are closer to the water surface.

The valves Sd and Sg are closed and thus a large free side that is needed for bringing the system into resonance is provided and the large free side would increase the displacement of the first working body 200 (Fig. 1a) preventing easy leading of the system to a safe position. Valves Sd and Sg can be electric valves that would close and open as needed. In that case energy must be provided to them, or they can be just openings of calculated diameter so that the amount of water that will enter the chamber V3 when the wave passes over the opening Sd is negligible, and the water that entered will come out after the wave withdraws or lowers under the opening Sd . This effect can be achieved by one-way valves that would allow water to come out faster than it enters the chamber V3.

FIG. 8a, when we want to bring the system to a safe position, we open the valves Sd and Sg and the generator raises the second working body 600 (FIG. 1). The first working body sinks and the water line passes over the valve Sd and water flows into the chambers V3 and the air exits through the valve Sg from the chambers, when the first working body 200 (Fig. 1) lowers to the appropriate support on the structure 300 (Fig. 1) their associated rigid gear 101a and 101b exits the grip with the gear 103a and 103b with rolls and the first working body 200 is fixed in that position. The second working body 600 is lowered by the generator to the provided support on the bottom of the structure 300 and the whole system is ready for big storms.

After the storm ends the system is brought to working position by raising the second working body to the upper position by the generator, then the first working body is uncoupled and lifted by hydraulics, mechanics and the like, to couple rigid gears 101a and 101b with gear 103a and 103b with rolls and then the second working body is lowered towards middle position and it pulls the first working body to the surface. Since the valves Sg and Sd are open when Sg, under the action of the second working body, comes above the water surface, the air will enter the chamber V3 and the water will flow out through the valve Sd. When the water is emptied from chamber V3, valves Sg and Sd close and the system is in the operating position.

FIG. 9 is a schematic view of the first working body with a movable external wrapper Om that has its positive displacement. The external wrapper Om can be designed in such way that it can move along the sphere around the first working body of a sphere radius same as the first working body or with a gap which would provide less water or air passing between them. FIG. 9 shows the first working body moving downwards under the action of a waves. Due to its mass and the damping of the generator the first working body moves more slowly than the Om wrapper. In this case the Om wrapper increases the mass of captured water W3 and also the force in the racks resulting in higher output energy.

Figure 10:
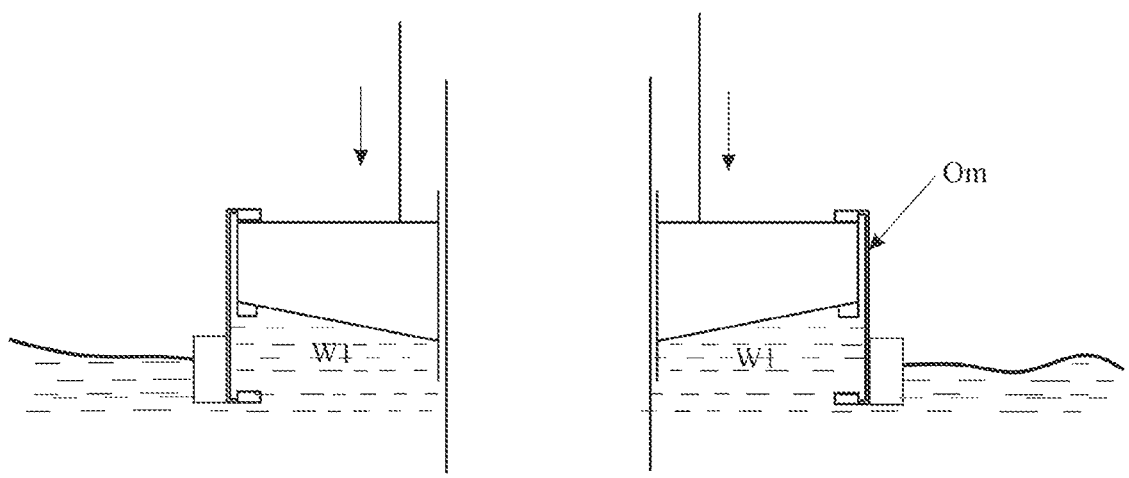
FIG. 10 is a schematic front view of the movable outer wrapper in the lower position.
Figure 10A:
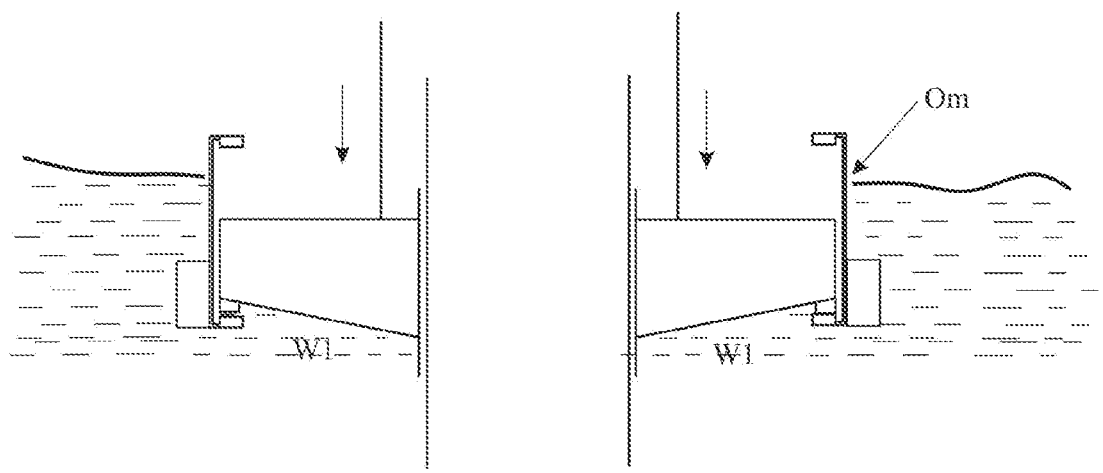
FIG. 10a is a schematic front view of the movable outer wrapper in the upper position.

FIG. 10a shows the situation when the wave approaches then the external wrapper Om moves faster than the first working body protecting it from splashing of the waves and covering the upper surface of the first working body with water and exactly that is a precondition for resonating the system causing the increase of produced energy.

The external wrapper is used with a larger diameter of the first working body in order to reduce the splashing of the upper surface of the first working body as well as to allow a larger volume of captured water W3' and thus greater tensile force in rigid gears 101a and 101b resulting in higher energy and easier resonance of the system.

Figure 11:
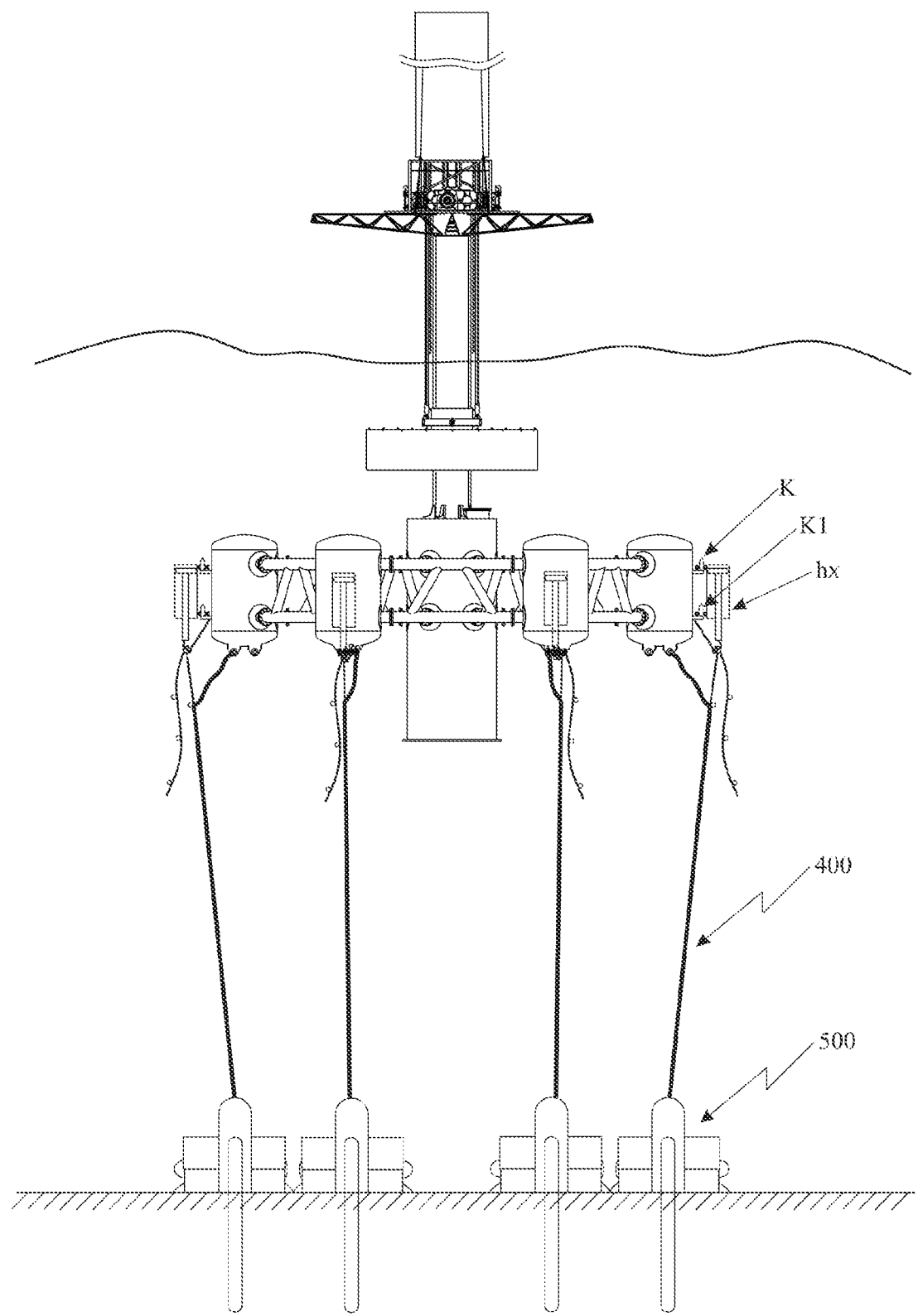
FIG. 11 is a schematic front view of positioning the system in the working position by means of hydro cylinders.
Figure 11A:
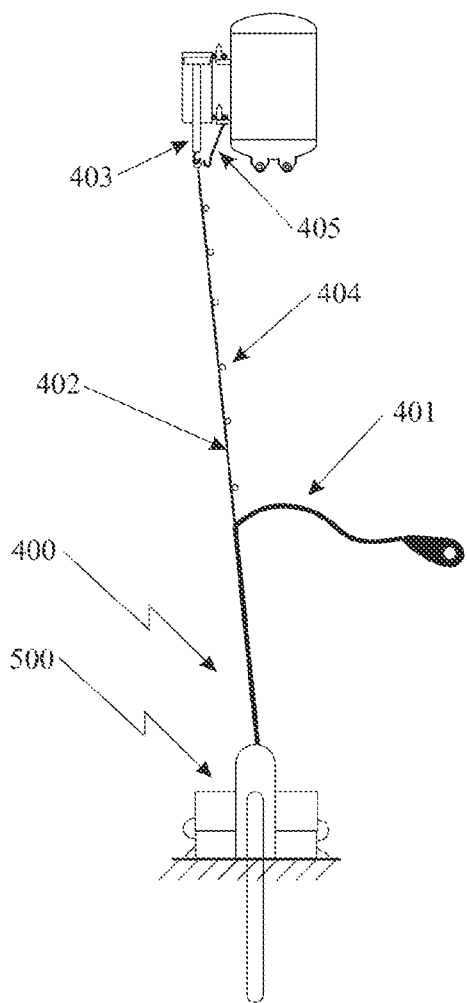
FIG. 11a is a schematic front view of positioning the system when the hydro cylinder is retracted (in the initial stage of immersion).
Figure 11B:
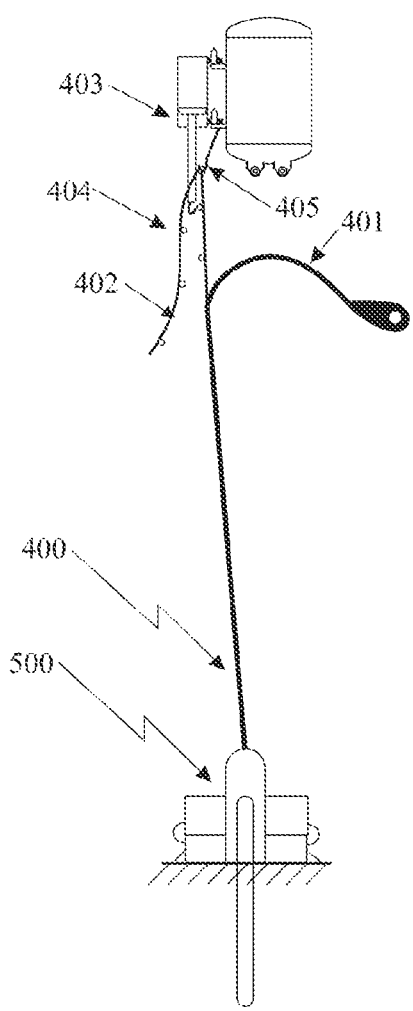
FIG. 11b is a schematic front view of system positioning when the hydro cylinder is pulled out (in the intermediate phase of immersion)
Figure 11C:
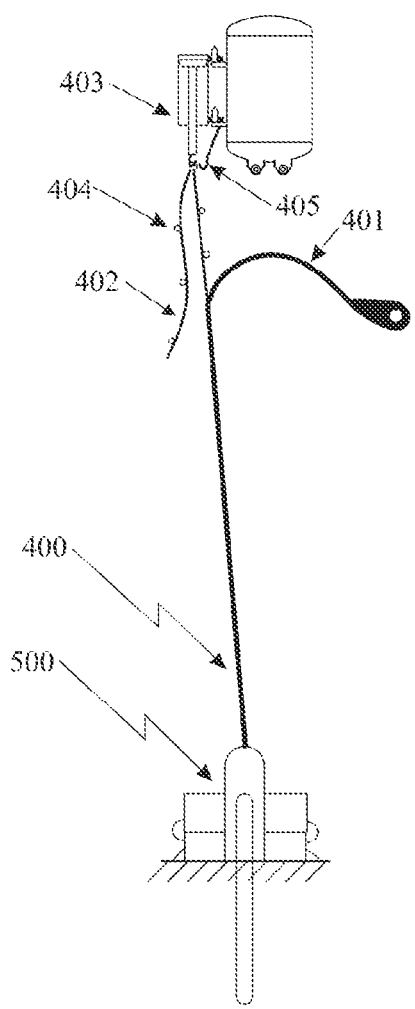
FIG. 11c is a schematic front view of system positioning when the hydro cylinder is retracted (in the final immersion phase)

FIG. 11 shows a hydraulic system for bringing the structure 300 to the exact working depth and balancing of forces in the anchor cables.

Large platforms for wind generators on water, for example, have large static forces in the anchor cables and they collectively divide the large static force into three because they couple at three points due to the fact that the plane is defined with three points, if more cables were inserted, the static force would be reduced but it is difficult to provide that all points of attachment are in the same plane, i.e. to have the same tensile force in all anchor cables.

The presented patent solves this in an easy, cheap and efficient way.

At the external points on the structure 300 near the binding points of the anchor cables, hooks or bearings K, K1 should be provided where hydraulic cylinders hx with a hook system as in FIG. 11 would be placed. Fixed hook 405, which can be made as a chain, cable, solid body and the like, is fixed to the structure 300 so that when the hydraulic cylinder retracts, fixed hook can hook up to the opening on the cable 402 which is dragged by the hydraulic cylinder. The structure 300 is brought to the precisely predicted location above the anchor 500, then the pistons of the hydraulic cylinder having cables, chains and the like with one hook at their ends are pulled out. The cable 402 with openings at a distance slightly less than the stroke of the cylinder is attached to the cable 400. The number of openings 404 on the cable 402 is defined by the depth of immersion of the structure 300 and the stroke of the piston.

Lowering of the structure 300 is performed in such a way that end hook of the cable 402 hooks to the hook at the end of the hydraulic cylinder and all the cylinders start to retract and thus the structure 300 is lowered below the water surface level. When the cylinders are retracted, the fixed hooks 405 hook to the cable 402, then the hydraulic cylinders pull out and the cable 405 holds the structure 300 preventing its lifting. When the cylinders are pulled out the second opening on the cable 402 attaches to the hydraulic cylinder 403 and the process of retracting the cylinder begins and so the structure 300 starts to lower, the process is repeated until the structure 300 reaches the desired depth. When the structure 300 has reached the desired depth, then all the cylinders can be connected in parallel via the hydraulic distributors, i.e. the same chambers in the hydraulic cylinders are connected in parallel and thus the force in all anchor ropes is equalized (known to experts in this field), then the cables 400 attach to the structure 300 in bearings which can be adjusted in length by means of threads, washers, cones or the like and when all the ends of the cables 400 are equally tightened and fixed to the structure 300 hydro pistons are pulled out and all the emerging force of the structure is taken over by the cables 400 and the structure 300 is positioned to the desired depth. This solves the problem of lowering the structure 300 and balancing all forces in the anchor cables. If the 300 system has a shifted center of gravity when balancing, i.e. bringing the hydraulic cylinder into parallel connection, the verticality of the device must be provided when balancing the forces in the anchor ropes. The force in anchor ropes can be balanced individually by means of hydraulics and controlled pressure valves. This is known to experts in this field.

After positioning of the structure 300 is completed, the hydraulic cylinders are removed and can be installed on another structure 300 in order to position it.

The drive for the hydraulic cylinders can be on board and the hydraulic hoses can be stretched from the hydraulic engine to the cylinders.

In order to use smaller diameter hydraulic cylinders, water can be partially let into the structure 300 which obtains a smaller displacement and when the structure 300 is placed in the desired position then the pressurized air is released to the upper valves in the structure 300 disposing the previously released water.

The supporting structure of the motion transformation system 100 include peripheral elements that form a generally hexagon configuration. The peripheral elements of structure 300 are spaced radially outwardly from the central structure and are interconnected to each other by a series of rods or pipes. Each peripheral element is connected to the central structure by a series of rods or pipes. While six peripheral elements are shown, it is contemplated that three to ten peripheral elements could be used. Anchors 500 are connected to each peripheral element by a tether in the form of cable or chain, for example. So if six peripheral elements are used, there are six anchors used to secure the peripheral elements. Extending upward from the central structure is a vertical support tower. Float 200 moves vertically along the support tower. The motion transformation system 100 can also include a wind generator in the form of a wind turbine that can be coupled on top of the motion transformation system 100 so that the wind generator can work simultaneously with the WEC device when it is in working mode, and it can also work smoothly when the WEC device is in safety mode.

The invention claimed is:

1. A device for conversion of wave energy, of body of water having a water surface and a seabed, into electrical energy wherein the device comprises:
   a support structure, that is configure to float above the seabed,
   a series of anchors positioned on the seabed and configured to secure the position of the support structure by use of tethers;
   a first working body that is slidably connected to the support structure and is configured to float at or near the surface of the body of water and move in a vertical direction;
   a first vertically oriented rigid gear rack that is pivotally coupled to the first working body at a first end of the first working body, the first gear rack configured to move vertically with vertical movement of the first working body, the first gear rack configured to engage and rotate a pinion gear that is coupled to a generator upon vertical movement of the first gear rack;
   a second working body that is slidably connected to the support structure;
   a second vertically oriented rigid gear rack that is coupled to the second working body at a first end of the second working body, the second gear rack is generally parallel to the first gear rack and is connected to the pinion gear, wherein the second working body provides a constant load to tension the first and second gear racks and wherein upward vertical movement of the first working body causes downward vertical movement of the second working body; and wherein the anchors can be transported independently of the support structure.

2. The device for conversion of wave energy into electrical energy of claim 1, wherein the first gear rack can be disengaged from the pinion gear.

3. The device for conversion of wave energy into electrical energy of claim 2, wherein the first gear rack is disengaged from the pinion gear by moving the first gear rack away from the pinion gear.

4. The device for conversion of wave energy into electrical energy of claim 2, wherein the first gear rack is separated from the pinion gear by the use of a mechanism driven by an electric or a hydraulic cylinder.

5. The device for conversion of wave energy into electrical energy of claim 1, wherein the first working body includes at least one chamber.

6. The device for conversion of wave energy into electrical energy of claim 5, wherein the at least one chamber of the first working body includes a valve that is configured to allow water to enter the chamber and a valve that is configured to allow air to exit the at least one chamber.

7. The device for conversion of wave energy into electrical energy of claim 1, wherein the first working body does not keep afloat on the surface of the water if the first working body is not connected to the second working body.

8. The device for conversion of wave energy into electrical energy of claim 1, wherein the first working body, when placed into a safety position, becomes affixed to the support structure in order to prevent movement around the support structure.

9. The device for conversion of wave energy into electrical energy of claim 1, wherein the first working body includes a movable wrapper that is configured to move along an axis of the first working body wherein the first working body moves slower than the wrapper.

10. The device for conversion of wave energy into electrical energy of claim 1, wherein the support structure include a plurality of interconnected peripheral elements that form a hexagon configuration.

11. The device for conversion of wave energy into electrical energy of claim 1, further including a transport body that is configured to float on the water surface.

12. The device for conversion of wave energy into electrical energy of claim 11, wherein the internal pressure of the transport body can regulated.

13. The device for conversion of wave energy into electrical energy of claim 12, wherein the transport the speed at which the transport body can be immersed into the water can be adjusted.

14. The device for conversion of wave energy into electrical energy of claim 13, wherein the transport body can be raised in the water by the use of compressed air.

15. The device for conversion of wave energy into electrical energy of claim 13, wherein the amount of air within the transport body can be regulated.

16. A device for conversion of wave energy, of body of water having a water surface and a seabed, into electrical energy wherein the device comprises:

a support structure, that is configure to float above the seabed, a series of anchors positioned on the seabed and configured to secure the position of the support structure by use of tethers;

a first working body that is slidably connected to the support structure and is configured to float at or near the surface of the body of water and move in a vertical direction;

a first vertically oriented rigid gear rack that is pivotally coupled to the first working body at a first end of the first working body, the first gear rack configured to move vertically with vertical movement of the first working body, the first gear rack configured to engage and rotate a pinion gear that is coupled to a generator upon vertical movement of the first gear rack;

a second working body that is slidably connected to the support structure;

a second vertically oriented rigid gear rack that is coupled to the second working body at a first end of the second working body and is parallel to the first gear rack and is connected to pinion gear, wherein the second working body provides a constant load to tension the first and second gear racks and wherein upward vertical movement of the first working body causes downward vertical movement of the second working body.

* * * * *